June 21, 1966  J. G. PADELT  3,256,795
FOCAL PLANE SHUTTER FOR CAMERAS
Filed March 10, 1964  2 Sheets-Sheet 1

INVENTOR.
JOHANNES G. PADEL
BY
ATTORNEY

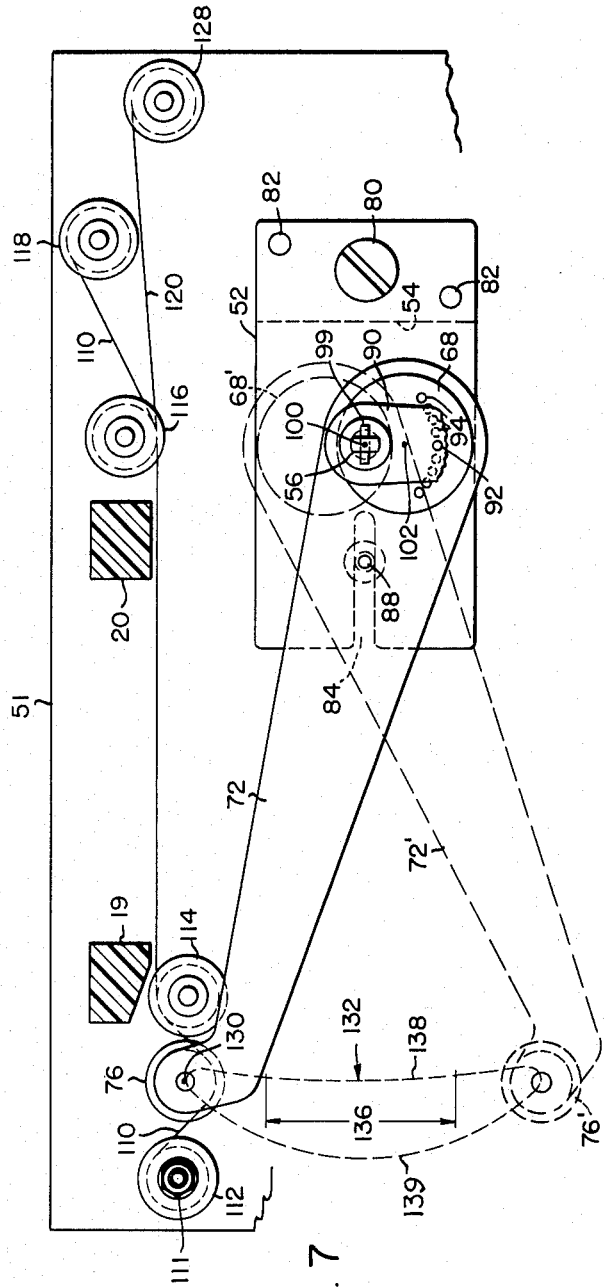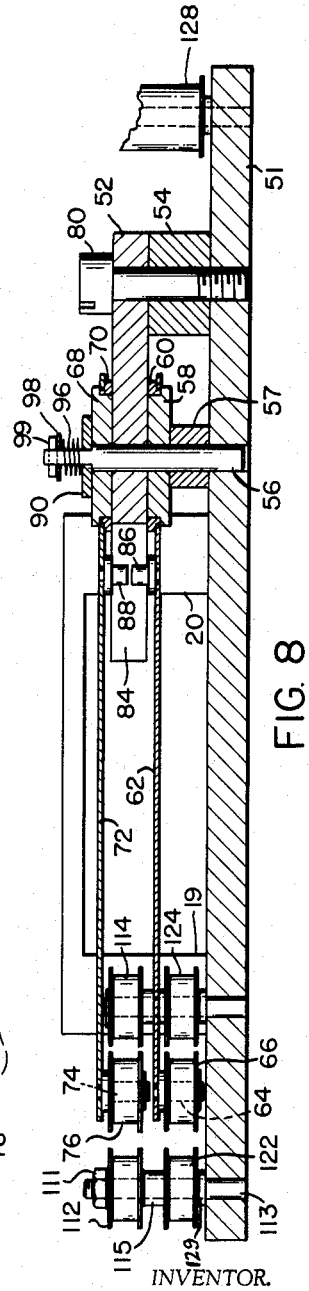

United States Patent Office 3,256,795
Patented June 21, 1966

3,256,795
FOCAL PLANE SHUTTER FOR CAMERAS
Johannes G. Padelt, Rochester, N.Y., assignor to Graflex, Inc., Rochester, N.Y., a corporation of Delaware
Filed Mar. 10, 1964, Ser. No. 350,825
12 Claims. (Cl. 95—57)

The present invention relates to photographic cameras, and more partcicularly to focal plane shutters for such cameras.

In a conventional focal plane shutter the curtains, with a preset slit width, are pulled across the camera aperture by spring tension, separate springs pulling the two curtains. With this construction, friction on the leading curtain may cause the trailing curtain to speed ahead, and thus reduce or close the exposure slit before time. With the conventional construction, moreover, the curtains are returned by a gear train. Due to the mass of the gear train, however, there is a sudden start and stop action in the curtain mechanism, thus causing two shock waves through the whole mechanism during a cycle of operation of the shutter. A camera having a focal plane shutter is a precision type camera; and these drawbacks of conventional such shutters are distinct disadvantages in such a camera.

One object of the present invention is to provide a focal plane shutter in which the curtains are pulled across the camera aperture positively by mechanically coupled actuating means, so that the two curtains cannot get out of time with one another.

Another object of the invention is to provide a focal plane shutter in which both the opening and the closing of the curtains is under positive control.

Another object of the invention is to provide a focal plane shutter in which the means for driving the same produces a slow start and stop action, thus avoiding any shock in the curtain mechanism.

Other objects of the invention will be apparent hereinafter from the specification and from the recital of the appended claims, particularly when read in conjunction with the accompanying drawings.

In the drawings:

FIGS. 1, 2, 3, 4, and 5 are diagrammatic views illustrating the operation of the shutter of this invention, FIG. 1 showing the positions of the curtains at the start of the exposure, FIG. 2 showing positions of the curtains at one point of the exposure stroke. FIG. 3 showing their positions at the end of the exposure stroke, FIG. 4 illustrating the beginning of capping of the exposure aperture by the curtains, and FIG. 5 illustrating the positions of the curtains toward the end of the return stroke when the exposure aperture is fully capped;

FIG. 7 is a plan view illustrating somewhat diagrammatically a focal plane shutter built according to one embodiment of this invention; and FIG. 8 is a fragmentary sectional view through this shutter mechanism taken in a plane at right angles to the view of FIG. 7.

Figure 1:
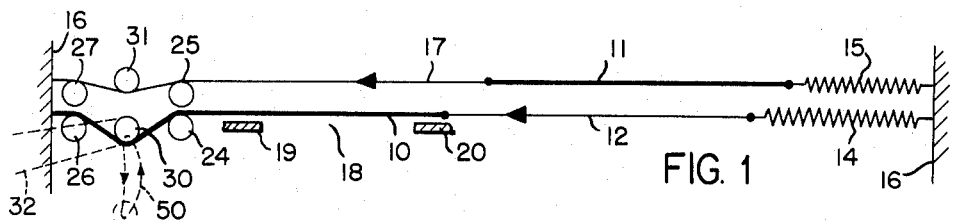

Referring first to FIGS. 1 to 5 inclusive, 10 and 11 denote, respectively, the leading or front curtain, and the trailing or rear curtain of a focal plane shutter operating according to the present invention. Curtain 10 is shown diagrammatically as connected at one side to the camera housing 16 and at its other side to conventional ribbons 12 which are in turn connected by a spring 14 to the camera housing 16. Spring 14 constantly urges the curtain 10 to returned rest position. Curtain 11 is shown diagrammatically as connected at one side by a return spring 15 to the camera housing 16 and as connected at its other side through ribbons 17 to the camera housing.

The curtain 10 in the position shown in FIG. 1 caps and covers the exposure aperture 18 of the camera. This aperture is framed by the side walls 19 and 20. Curtain 10 rides under the guide rollers 24 and 26 which rotate on fixed axes. The ribbons 17 of curtain 11 travels under idler guide rollers 25 and 27 which also rotate on fixed axes.

Between the rollers 24 and 26 the curtain 10 is engaged by a roller 30 which is carried on the end of an arm 32 (FIG. 6), that is driven from the shaft 34 through a disc 36 which is disposed eccentrically of the shaft and which is rotatably mounted in an aperture in the arm. The center of the eccentric is denoted at 38; and the axis of the shaft is designated 40. As the shaft rotates, the center 38 of the eccentric travels in a path 42 about the axis 40 of the shaft. For control of the path of movement of the arm 32, a pin 44 is secured to the arm to move in a guide slot 46 in a relatively fixed portion of the camera. In the instance shown, this guide slot is curved. As the shaft 36 rotates, the center of the roller 30 will follow a path such as denoted at 50 in dotted lines in FIG. 6.

The ribbons 17 of the curtain 11 are engaged by a similar roller 31 carried by a second lever similar to the lever 32 and eccentrically mounted and driven the same as the lever 32.

FIG. 1 shows the starting positions of the several parts.

Figure 2:
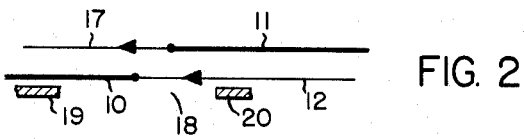

As the lever-carried rollers 30 and 31 travel downwardly in their respective paths, the curtain 10 is pulled to the left, as shown in FIG. 2, uncovering the exposure aperture 18 before the curtain 11 will have moved far enough to the left to cover the aperture again. Thus, the film behind the curtains and aperture is exposed, the time of exposure depending upon the slit-width between the curtains, that is, upon the distance between their trailing and leading ends, respectively, and upon their relative speeds of travel during exposure.

Figure 3:
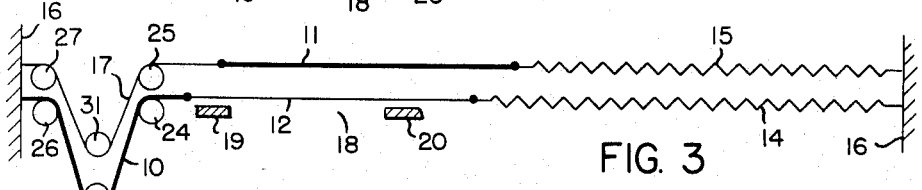

As the rollers 30 and 31 travel still further in their paths, the curtain 10 is opened fully; but the aperture is covered by the curtain 11, as shown in FIG. 3, which illustrates the positions of the curtains at the end of the exposure. As will be seen, the springs 14 and 15 are both stretched.

Figure 4:
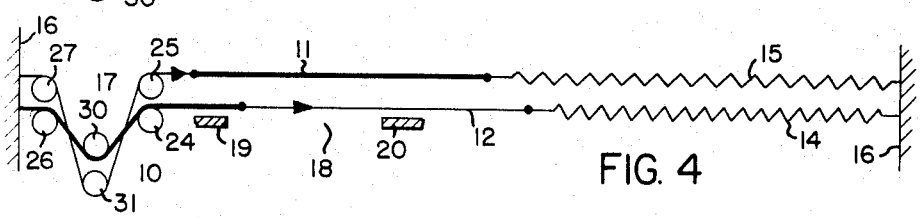

As a result of the continued movement of the arm 32, which carries the roller 30, this roller now begins, as will be seen in FIG. 4, to release the curtain 10, while the roller 31 is still moving the curtain 11 somewhat to the left. The leading curtain 10 thus begins its capping movement.

Figure 5:
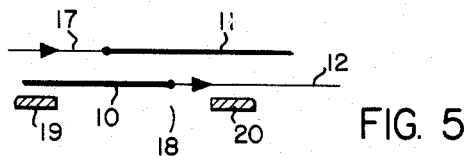

Immediately thereafter roller 31 begins to release its tension on the ribbons 17, and spring 15 causes the trailing curtain 11 to move to the left. FIG. 5 illustrates the positions of the parts, near the end of their return strokes. Curtain 10 has almost covered the exposure aperture; and curtain 11 is also nearing the position shown in FIG. 1 in which it is to the right of the exposure aperture.

Apparatus constructed according to one embodiment of this invention is illustrated in FIGS. 7, 8 and 9. Here 51 indicates a base plate fixed to the camera housing. Journaled in the base plate and in a guide plate 52 that is disposed parallel to the base plate, and that is spaced from the base plate by a spacer block 54 is a shaft 56.

Figure 6:
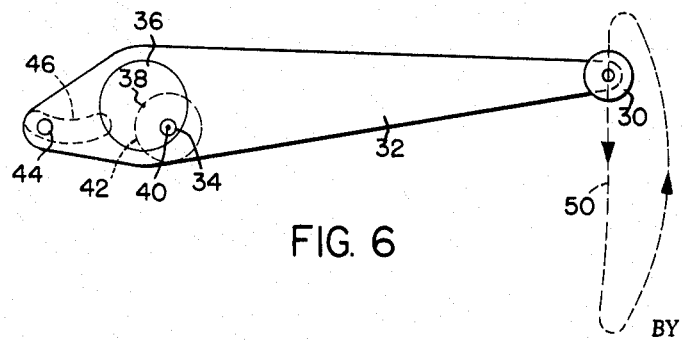
FIG. 6 is a diagrammatic view illustrating the action of one of the curtain-actuating levers.

Spaced from base plate 51 by a spacer block 57 and welded to the shaft 56 is an eccentric disc 58. Connected to this disc by a bearing 60 is an arm 62 which performs the same function as arm 32 (FIG. 6). Arm 62 carries at its outer end a stud 64 on which roller 66 is journaled.

Disc 58 and arm 60 are disposed below guide plate 52. Mounted above guide plate 52 to be rotatably adjustable on shaft 56 is a second eccentric disc 68. Connected to this disc through a bearing 70 is an arm 72 which carries at its outer end a stud 74 on which a roller 76 is journaled.

Guide plate 52 is rigidly secured to base plate 51 by a screw 80 and dowel pins 82. It has a slot 84 in its free end in which the studs 86 and 88, that are carried by the levers 62 and 72, respectively, engage. This slot is straight, although it can be curved like slot 46 (FIG. 6) or made to any shape suitable for obtaining the desired shutter operation.

The shaft 56 may be rotated by a crank 90 or by any other suitable means. To adjust the slit-width to control the time of exposure of the film, lever 72 is made adjustable angularly relative to lever 62. For purposes of this adjustment a pin 92 is secured rigidly in the crank lever 90 to engage selectively in one of a plurality of holes 94 in disc 68, that are spaced from one another in an arc about the axis of shaft 56. The pin 92 is resiliently held in engagement with the selected hole 94 in the disc 68 by a spring 96 which seats against the crank lever 90 and is interposed between the crank lever and a washer 98 which is held on the reduced diameter upper end of the shaft 56 by a nut 99. In FIG. 7 100 denotes the axis of the shaft 56 and 102 the location of the axis or center line of the disc 68 in the position in which the pin 92 engages the central of the series of holes 94.

In FIG. 7 the leading or front curtain is denoted at 110. It is anchored at one end to a spool 112, which is rotatably adjustable on a post 113 (FIG. 8) that is welded in the base 51. It passes under the roller 76, which is carried by arm 72, and over idler rollers 114 and 116 and is connected at its other end to a spring-loaded type curtain roller 118.

The trailing or rear curtain 120 is similarly anchored at one end to a spool 122, which is also rotatably adjustable on post 113 and which is spaced from spool 112 by a spacer sleeve 115 that surrounds the post. It passes under the roller 64, which is carried by arm 62, and over an idler roller 124, and a second idler roller mounted coaxially with the idler roller 116; and it is connected at its other end to a spring-loaded curtain roller 128.

The rotary angular adjustments of the spools 112 and 122 on post 113 permit calibrating the shutter. After adjustment the spools are secured in adjusted positions by tightening nut 111 which threads on post 113. This causes spool 112 to be held frictionally against the upper face of spacer 115 and spool 122 to be held frictionally between spacer 115 and a washer 129 that is disposed between base plate 51 and spool 122. If desired, the upper and lower faces of ring 115, the lower face of spool 112, and the upper face of spool 122 can be toothed in the manner of toothed face couplings to hold the spools more securely in their adjusted positions.

The rotary angular adjustments of spools 112 and 122 enable the shutter to be calibrated quickly and easily. This method of calibration contrasts with prior practice in which the curtains or their lead ribbons are glued to the anchoring spools or other anchoring parts, and the curtains or their lead ribbons have to be repeatedly attached and detached in a cut-and-try process until the desired calibration is achieved.

One extreme position of swing of one of the arms 72 is shown in full lines in FIG. 7; and the other extreme position of this arm is shown in dotted lines at 72'. In the movement of the arm the roller 76 moves from the full-line position shown to the dotted line position shown at 76'. In its travel, the center 130 of this roller moves in the path 132, which is like the path 50 shown in FIG. 6. The forward exposure stroke portion of the path is denoted at 138; and the return stroke portion is designated at 139. The exposure takes place during the portion 136 of path 138. The roller 66 carried by arm 62 performs a motion similar to that of roller 76. The adjustable angular offset of roller 66 to roller 76 made possible by engagement of pin 92 in different holes 94 determines the slot-width of the shutter, hence the exposure time.

The shaft 56 may be driven by any suitable means.

Because of the eccentric, crank-actuated motion of arms 72 and 62, the rollers 76 and 66 have smooth, slow start and stop movements and pull the curtains positively on the exposure stroke of the shutter. Thus smoother, faster operation is attainable with the mechanism of the present invention than has been possible heretofore with a focal plane shutter. The curtain rollers 76 and 66 start very gently from a stand still, speed up fast for the exposure, and without stopping turn the corner, as shown at 50 and 132 (FIGS. 6 and 7), return fast and come to a slow stop which is as gentle as the start. With the shutter of this invention it is possible, for instance, to take seven pictures a second with a 70 mm. camera.

While the invention has been described in connection with one embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A focal plane shutter for a photographic camera which has a film exposure aperture, said shutter comprising
   (a) a leading curtain,
   (b) a trailing curtain,
   (c) means engaging said leading curtain intermediate its ends for effecting controlled positive movement of said leading curtain across said aperture,
   (d) means engaging said trailing curtain intermediate its ends for effecting controlled positive movement of said trailing curtain across said aperture, and
   (e) means for adjusting one of said two means relative to the other to adjust the distance between the trailing edge of the leading curtain and the leading edge of the trailing curtain during their said movements, thereby to determine the length of the exposure of the film.

2. A focal plane shutter for a photographic camera which has a film exposure aperture, said shutter comprising
   (a) a leading curtain,
   (b) a trailing curtain,
   (c) spring means for returning and for constantly urging said curtains to positions in which said leading curtain covers said aperture and said trailing curtain is disposed at one side of said aperture, and
   (d) mechanical drive means engaging each curtain intermediate its ends for drawing said leading curtain across said aperture to expose the film and for drawing said trailing curtain across said aperture to cover said aperture after exposure, and
   (e) means for driving said mechanical drive means at a varying velocity to effect slow start and stop movement of each of said curtains.

3. A focal plane shutter as claimed in claim 2, wherein
   (a) said mechanical drive means comprises separate drive arms for the two curtains
   (b) rollers carried by the two arms for engaging the two curtains, respectively, intermediate their respective ends, and
   (c) two eccentrics for driving the two arms, respectively, at varying velocities,
   (d) the two eccentrics being adjustable relative to one another to control the time of the exposure.

4. A focal plane shutter for a photographic camera which has a film exposure aperture, said shutter comprising
   (a) a leading curtain,
   (b) a trailing curtain,
   (c) spring means for returning and for constantly urging said curtains to positions in which said leading curtain covers said aperture and said trailing curtain is disposed at one side of said aperture,
   (d) a pair of rotatable crank arms, (e) a pin carried by each crank arm, one of said pins being operatively connected to the leading curtain to move it against the resistance of said spring means in a direction to uncover said aperture upon rotation of one crank arm, and the other of said pins being operatively connected to the trailing curtain to move it against the resistance of said spring means in a direction to cover said aperture upon rotation of the other crank arm, and (f) means for rotating said crank arms.

5. A focal plane shutter as claimed in claim 4, wherein said two crank arms are rotatable about a common axis, and are adjustable one relative to the other about said common axis to adjust the slit-width of the shutter.

6. A focal plane shutter for a photographic camera which has a film exposure aperture, said shutter comprising (a) a leading curtain,
(b) a trailing curtain,
(c) means for effecting and controlling the movement of each curtain comprising an arm which is operatively connected to the curtain and which has a circular opening therein,
(d) a circular disc mounted in said opening,
(e) a shaft to which said disc is eccentrically secured,
(f) means for rotating said shaft, and
(g) means engageable with each arm to control the exact path of movement of the arm during a revolution of said shaft.

7. A focal plane shutter as claimed in claim 6, wherein
(a) each arm carries a roller, and
(b) the rollers engage, the two curtains, respectively, to effect the operative connections of the arms therewith.

8. A focal plane shutter as claimed in claim 6, wherein springs means is connected to the two curtains to resist movement of said curtains by said arms and to return said curtains to their at-rest positions.

9. A focal plane shutter for a photographic camera which has a film exposure aperture, said shutter comprising (a) a leading curtain,
(b) a trailing curtain,
(c) a rotary shaft,
(d) a pair of circular discs, one of which is secured to said shaft and the other of which is rotatably adjustable relative to said shaft, and each of which is mounted eccentrically of said shaft,
(e) two arms, each arm having a circular opening therein to receive one of said discs,
(f) means for securing one end of each curtain fast,
(g) spring means secured to the other end of each curtain to urge it constantly in one direction,
(h) a roller carried by each arm, said rollers being disposed to engage the two curtains, respectively, intermediate their ends,
(i) means for rotating said shaft to drive said arms and said curtains and to effect slow start and stop movements thereof, and
(j) means for controlling the movement of each arm comprising a pair of interengaging guide members, one of the guide members being on the arm and the other on a relatively stationary part of the camera.

10. A focal plane shutter as claimed in claim 9 wherein means is provided for securing said shaft to said other disc after adjustment of said shaft relative to said other disc.

11. A focal plane shutter as claimed in claim 9, wherein the means, to which said one end of each curtain is secured fast, is adjustable to permit calibration of said curtain.

12. A focal plane shutter for a photographic camera which has a film exposure aperture, said shutter comprising (a) a leading curtain,
(b) a trailing curtain,
(c) a pair of spools to which the two curtains are respectively anchored at their two ends,
(d) a stationary stud on which the two spools are rotatably adjustable,
(e) means for anchoring the spools to the stud after adjustment of the spools on the stud,
(f) spring means to which the other ends of said curtains are connected for constantly urging them to positions in which said leading curtain covers said aperture and said trailing curtain is disposed at one side of said aperture,
(g) a pair of rotatable crank arms,
(h) a pin carried by each crank arm, one of said pins being operatively connected to the leading curtain intermediate its ends to move it against the resistance of said spring means in a direction to uncover said aperture upon rotation of one crank arm, and the other of said pins being operatively connected to the trailing curtain to move it against the resistance of said spring means in a direction to cover said aperture upon rotation of said other crank arm, and
(i) means for rotating said crank arms.

References Cited by the Examiner
UNITED STATES PATENTS

| 2,435,835 | 2/1948 | Hineline | 95—57 |
| 2,446,638 | 9/1948 | Crumrine | 95—57 |
| 2,472,607 | 6/1949 | Mihalyi | 95—57 |

JOHN M. HORAN, *Primary Examiner.*